US005504382A

United States Patent [19]
Douglass et al.

[11] Patent Number: 5,504,382
[45] Date of Patent: Apr. 2, 1996

[54] FIELD CONTROLLED PERMANENT MAGNET ALTERNATOR

[76] Inventors: Michael J. Douglass, R.D. 3, P.O. Box 50B, Oxford, N.Y. 13830; Scot A. Webb, P.O. Box 655, East Cayuga St., North Norwich, N.Y. 13814

[21] Appl. No.: 185,541

[22] Filed: Jan. 24, 1994

[51] Int. Cl.⁶ .................................................. H02K 21/12
[52] U.S. Cl. .................... 310/156; 310/114; 310/178; 310/184; 310/258; 310/271
[58] Field of Search .................................. 310/112, 114, 310/178, 179, 180, 184, 181, 258, 156, 194, 271; 322/48

[56] References Cited

U.S. PATENT DOCUMENTS

| | | | |
|---|---|---|---|
| 3,017,562 | 1/1962 | Duane | 310/258 |
| 3,614,496 | 10/1971 | Schiethart | 310/258 |
| 3,743,873 | 7/1973 | de Jong | 310/156 |
| 4,032,807 | 6/1977 | Richter | 310/178 |
| 4,134,054 | 1/1979 | Akamatsu | 310/112 |
| 4,339,874 | 7/1982 | McCarty | 310/156 |
| 4,385,251 | 5/1983 | Mallick | 310/178 |
| 4,486,678 | 12/1984 | Olson | 310/156 |
| 4,631,435 | 12/1986 | McCarty | 310/156 |

*Primary Examiner*—R. Skudy
*Attorney, Agent, or Firm*—Carl A. Rankin; William E. Zitelli

[57] ABSTRACT

An alternator, or the like including a stator assembly and a rotor assembly within the stator assembly, wherein the stator assembly includes a pair of axially spaced core sections with a stationary field coil located therebetween. The field coil is formed of convolutions extending circumferentially about the axis of the device. The rotor assembly has a homopolar core with a pair of axially spaced pole sections in locations corresponding to the respective stator core sections. A central yoke portion extends between the two pole sections and is axially aligned within the field coil. A plurality of permanent magnets are mounted circumferentially on each of the pole sections at symmetrically spaced locations between pole sectors of the respective section.

11 Claims, 2 Drawing Sheets

FIELD CONTROLLED PERMANENT MAGNET ALTERNATOR

BACKGROUND OF THE INVENTION

This invention relates to electromechanical devices such as alternators, generators and the like and especially to hybrid devices that combine the features of field controlled-type alternators and permanent-magnet-type alternators. More particularly, the invention relates to a hybrid-type alternator that utilizes a stationary field coil to control the voltage output as well as a permanent-magnet-type arrangement.

Permanent-magnet-type alternators are used in a variety of applications including aircraft engine systems. While these devices have many advantages including light weight and compact construction, they do have some practical limitations due to the direct relationship between voltage and rotor speed. In other words, the open circuit voltage is directly proportional to the rotational speed of the device. The maximum output voltage may be an important design consideration for permanent-magnet-type alternators in view of certain factors such as corona, insulation, altitude requirements, connector insulation resistance and the maximum voltage capability of the load.

The life and integrity of semi-conductor control electronics, are especially vulnerable to voltage levels beyond their capabilities. The subsequent limitation on the maximum output voltage from the alternator can preclude the use of permanent-magnet-type devices in some applications where a large speed ratio is required.

One solution to the problems outlined above, is to utilize a field-controlled alternator to overcome the high voltage problem of the permanent-magnet-type alternator. A typical construction of such a device includes a wound rotor, where the rotor field is regulated externally by a control circuit that senses and controls the alternator output voltage. The field power is supplied to the rotor by an "inside-out" (stationary field, rotating armature) alternator through a rotating rectifier assembly. Both of these components are typically on the same shaft and in the same package as the main rotating-field alternator itself. A small permanent magnet alternator section is included in the device to provide the initial field power to get the main alternator started.

While this type of alternator provides a means for limiting the output voltage at high speeds, it has certain disadvantages as well. Most importantly, placing windings on the rotor is often unacceptable due to mechanical stresses. This makes the device vulnerable to failure under certain conditions.

An alternative to the wound rotor, field controlled alternator is a stationary-field controlled permanent magnet alternator. This configuration would have the voltage control feature of the traditional field-controlled device, but also would provide the inherent reliability of a permanent magnet alternator. The rotor construction would be similar to that in a permanent magnet alternator, and there would be no windings on the rotor and no rectifier assembly. The magnets would provide a self-starting feature for the alternator that would eliminate the need for the field power alternator in the traditional device. An additional advantage of the field controlled, permanent magnet alternator is that if the field power failed, there would still be power supplied due to the permanent magnets in the rotor.

One particular type of field-controlled permanent magnet alternator is referred to as a hybrid homopolar alternator. This type of device has a permanent magnet section on the shaft which may share the same stator as the homopolar alternator. In this type of construction, the permanent magnet section provides both the starting flux for the homopolar section, as well as some output power to the load. Prior art devices of this type, however, have been complex and cumbersome. This makes them unsuitable for certain applications including aircraft engine systems.

The device of the present invention, however, resolves the difficulties referred to above and affords other features and advantages heretofore not obtainable.

SUMMARY OF THE INVENTION

The present invention provides an alternator design that includes as its primary components, a stator housing with a central axis, a coaxial stator assembly retained within the housing, and a coaxial rotor assembly within the stator assembly. In accordance with the invention, the stator assembly has a pair of axially spaced core sections formed of ferromagnetic material, and a central section between the core sections, wherein a stationary field coil formed of convolutions extending circumferentially about the axis is mounted. The core sections are also provided with axially extending stator windings or armature windings for the device.

The rotor assembly has a homopolar core formed of ferromagnetic material with a pair of axially spaced pole sections operatively associated with the respective stator core sections and having a plurality of radially extending pole sectors. A central yoke portion extends between the pole sections and is operatively associated with the field coil. A plurality of permanent magnets are mounted circumferentially on each of the pole sections at symmetrically spaced locations between the sectors of the respective pole section.

The result is a hybrid homopolar-type alternator with a permanent magnet alternator arrangement that provides unique and novel results suitable for a great variety of applications.

DESCRIPTION OF THE PREFERRED EMBODIMENT

Figure 1:
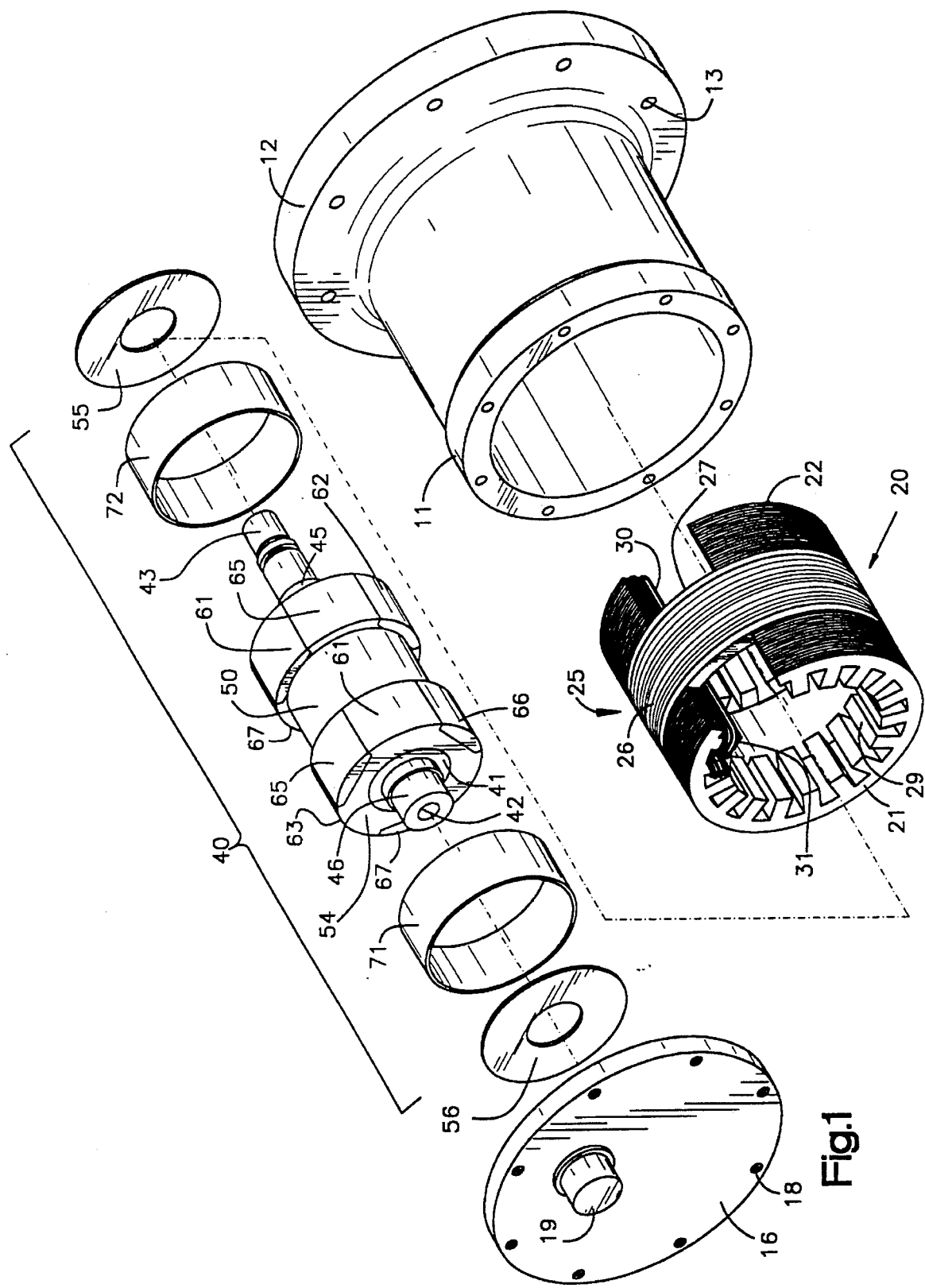
FIG. 1 is a partially exploded perspective view illustrating the relationship of the principal components of the alternator of the invention but with certain components eliminated and with part of the stator broken away and shown in section for the purpose of illustration.
Figure 2:
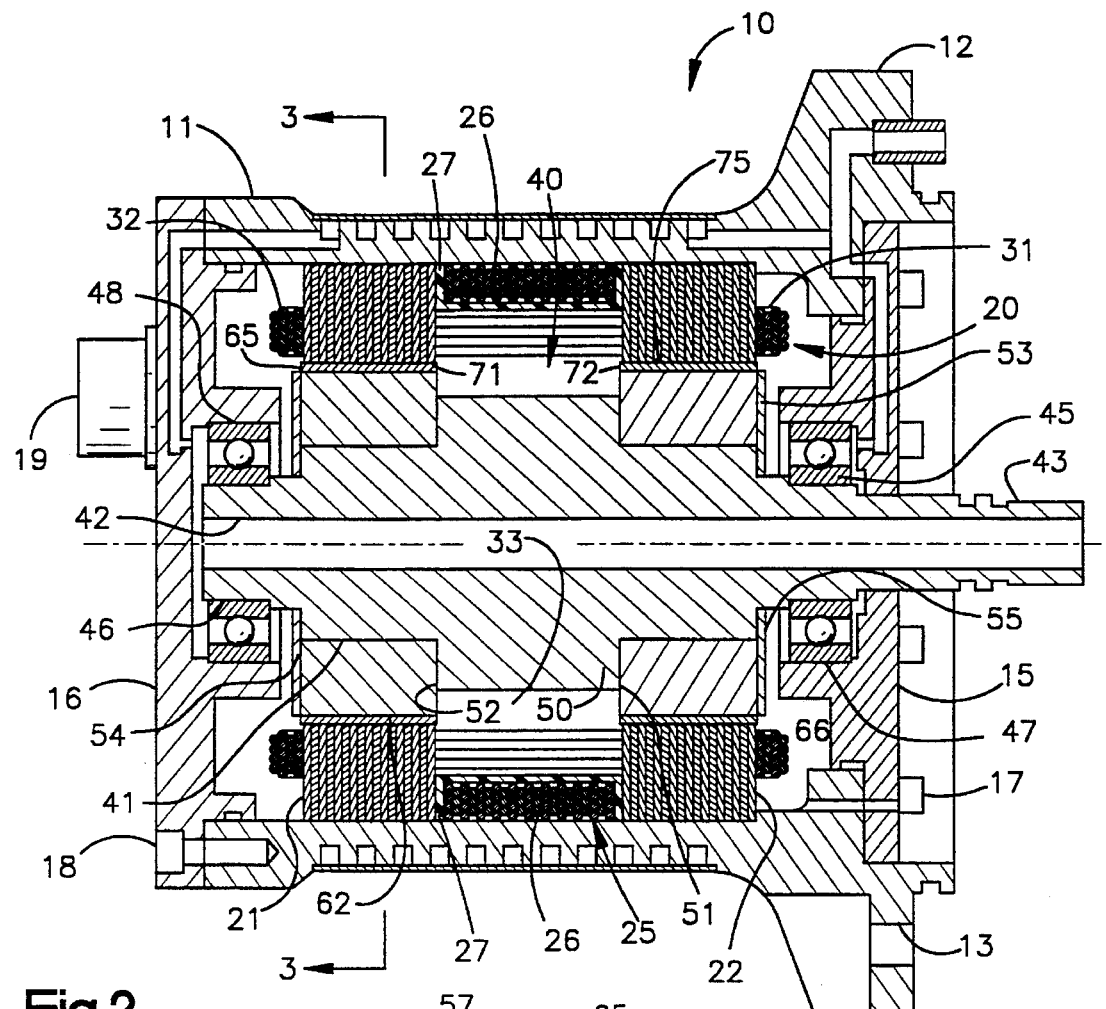
FIG. 2 is an axial sectional view of the alternator of FIG. 1.
Figure 3:
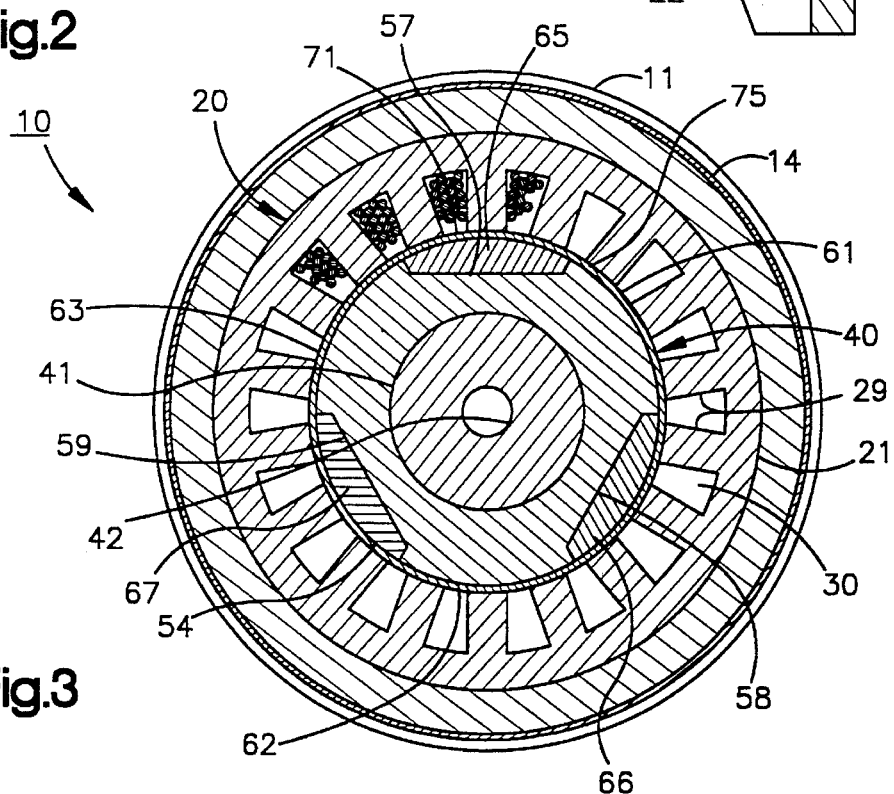
FIG. 3 is a transverse sectional view taken on the line 3—3 of FIG. 2.

Referring more particularly to the drawings, there is shown a particular embodiment of the invention in the form of a field-controlled, permanent magnet alternator 10. Although the invention is described herein with specific reference to an alternator, those skilled in the art will appreciate that such description is simply for the purpose of illustration and should not be construed in a limiting sense. The invention can be used advantageously with other electromechanical devices, wherein it is desirable to control the output voltage, rotational speed, torque, power factor, etc.

The alternator 10 includes, as its basic components, a stator assembly 20 and a rotor assembly 40, the stator assembly being adapted for mounting on an engine gear box or the like, in the customary manner. The rotor assembly 40 is mounted within the stator assembly and is adapted to be coupled to a shaft normally from the gear box.

The stator assembly 20 is tightly mounted such as by a shrink fit in a cylindrical housing 11 formed of ferromagnetic material. The housing is provided with a radial flange 12 at its inner end, and with bolt holes 13 symmetrically spaced circumferentially about the flange for use in securing the alternator to a gear box or the like.

The housing is also provided with an inner end plate 15 and an outer end plate 16, the inner end plate being secured to the housing by means of bolts 17 and the outer end plate 16 being be secured at the outer end of the housing by means of bolts 18. Socket-type connectors 19 may also be provided on the housing for use in making the appropriate electrical connections.

The stator assembly 20 comprises a pair of axially spaced core sections 21 and 22 formed of ferromagnetic material. The core sections are preferably formed of a series of laminations of highly permeable magnetic material such as 3% silicon iron, per ASTM A677, for example. The structure is formed by stacking the individual laminations in an axial direction for each of the two core sections 21 and 22. As indicated above, the stator assembly is tightly secured in the housing 11, such as by a shrink fit so that the outer surfaces of the core sections 21 and 22 are in intimate contact with the inner surface of the housing 11.

Located between the two core sections 21 and 22 is a center section 25 that is adapted to receive a annular field coil 26. The field coil 26 is wound in a spool 27 that serves as a spacer located between the adjacent radial end faces of the core sections 21 and 22. The spool is preferably formed of a nonconductive material.

Each of the core sections 21 and 22 has a plurality (in this case 18) of inwardly and radially extending teeth 29 that extend the axial length of each section 21 and 22. The corresponding axially aligned teeth of each core section have stator windings (i.e. armature windings) 30 located thereon, and extending between the two sections so that the central portions of the windings span the space defined by the center section 25. The windings 30 are located radially inward from the spool 27, the windings being formed by a plurality of axially extending convolutions of conductive copper wire.

As indicated in the drawings, the windings 30 have axially extending end portions or loops 31 and 32 formed at the opposites ends of the stator and symmetrically located circumferentially around the respective outwardly facing radial end faces of the core sections 21 and 22.

The rotor assembly 40 is positioned within the stator assembly 20 and is constructed and configured to provide a homopolar rotor core. The assembly comprises a hub 41 formed of ferromagnetic material and with an axial bore 42 extending therethrough. The inner end 43 of the hub extends inwardly beyond the inner end plate 15 and into the gear box where it may be coupled to a drive shaft. In the embodiment shown, the inner end 43 has its exterior provided with splines to facilitate coupling to the drive shaft.

At opposite ends of the hub 41 are an inner journal 45 and an outer journal 46. The journals are received in respective inner and outer bearing assemblies 47 and 48 mounted in the respective inner and outer end plates 15 and 16.

The hub has a radially expanded central section or yoke 50 that is axially located within the center section 25 of the stator assembly 20. The opposite ends of the yoke 50 are defined by annular shoulders 51 and 52 that provide a means for retaining inner and outer pole sections 53 and 54 on the hub. The pole sections are secured to the hub by means of inner and outer retainer plates 55 and 56 which fit not only against the outer surfaces of the pole sections, but also against another pair of shoulders that separate the pole supporting sections of the hub from the inner and outer journals 45 and 46 respectively.

Since the general construction of the pole sections 53 and 54 is the same, like numerals will be used to describe like parts in each section. The pole sections generally comprise an annular plate-like member with axially extending slots formed at symmetrically spaced locations around the circumference. In the present instance, three slots 57, 58 and 59 are provided and they serve to separate the respective pole sections 53 and 54 into three pole sectors 61, 62 and 63. Located in an axial alignment in each slot 57, 58 and 59 is a permanent magnet 65, 66 and 67.

It will be noted that the angular sector defined by the pole sectors 61, 62 and 63 is approximately the same as the angular sector defined by the permanent magnet 65, 66 and 67. In the present instance, each angular sector is approximately 60°. The permanent magnets 65, 66 and 67 extend axially the full length of the respective pole sections 53 and 54, and are retained in axial alignment by means of the retainer plates 55 and 56. Also, each pole section defines a cylindrical surface which may be ground to the desired dimensions once the magnets are assembled on the respective pole sections.

A cylindrical retainer sleeve 71 and 72 is preferably shrink fitted over the resulting pole sections.

The retainer sleeves may be formed of non-magnetic or of ferromagnetic material. The outer surfaces of the sleeves 71 and 72 and the inner surface of the respective stator core sections 21 and 22 define an air gap 75 which forms part of the magnetic circuit.

It will be noted that the resulting device provides a field controlled permanent magnet alternator with the homopolar core and permanent magnet sections located on the same shaft and sharing the same stator. In this arrangement, the permanent magnet portion provides both the starting flux for the homopolar section as well as some output power to the load.

The pole sectors 61, 62 and 63 of the pole section 53 are circumferentially offset 60° from the pole sectors of the pole section 54. This is necessary so that the pole sectors of the section 53 instantaneously align with stator teeth that are offset 60° from the stator teeth that are instantaneously aligned with the pole sectors of the section 54 which is of opposite polarity from the pole section 53.

Because the core sections 21 and 22 are separated from one another, the stator housing forms part of the magnetic circuit linking the two sections. The flux path that extends axially along the homopolar rotor hub between the pole sections 53 and 54 thus crosses the respective annular air gaps 75 at each end and axially along the housing between the stator core sections. It will be apparent that the permanent magnets 65, 66 and 67 of the pole section 53 are arranged in opposite polarity relative to the permanent magnets of the pole section 54.

The current in the field coil 26 may be regulated in response to the output voltage from the device. This influences the magnetic flux in the yoke 50 of the rotor hub 41.

The resulting device provides an increase in power density over prior art field controlled alternators by reducing the length of the device. Also, the reduced length will be advantageous to the shaft dynamics and bearing loads relative to prior art devices.

The inherent benefits of the permanent magnet rotor relative to a wound rotor are thus dramatically realized. The result is an inherently reliable field controlled alternator capable of high speed operation having a high power density providing enhanced capabilities for many applications.

While the invention has been shown and described with respect to a specific embodiment thereof, this is for the purpose of illustration rather than limitation and other variations and modifications of the particular devices herein shown and described will be apparent to those skilled in the art all within the intended spirit and scope of the invention. Accordingly, the patent is not to be limited in scope and effect to the specific device herein shown and described nor in any other way that is inconsistent with the extent to which the progress in the art has been advanced by the invention.

We claim:

1. An alternator including a stator housing having a central axis, a coaxial stator assembly retained within said housing and a coaxial rotor assembly within said stator assembly, said stator assembly having:
- a pair of axially spaced core sections formed of ferromagnetic material,
- stator yoke means connecting said core sections,
- a central section between said core sections and including a stationary field coil formed of convolutions extending circumferentially about said axis, and
- axially extending stator windings for said core sections;

said rotor assembly having:
- a core formed of ferromagnetic material, with a pair of axially spaced pole sections operatively associated with said core sections and having a plurality of radially extending pole sectors,
- rotor yoke means extending between said pole sections and operatively associated with said field coil,
- a plurality of permanent magnets mounted circumferentially on each of said pole sections between said sectors, and
- retainer sleeve means located around said pole sections.

2. An alternator as defined in claim 1 including an axially extending spool formed of dielectric material located in said central section and defining an annular recess facing radially outward, said field coil being located in said recess.

3. An alternator as defined in claim 2 wherein the axial length of said spool is about equal to the axial length of said rotor yoke means.

4. An alternator as defined in claim 3 wherein said windings of said stator extend axially through said central section adjacent said spool.

5. An alternator as defined in claim 1 wherein said rotor assembly has a homopolar core.

6. An alternator as defined in claim 1 wherein said pole sections are formed of a plurality of laminations.

7. An alternator as defined in claim 1 wherein said core sections are formed of a plurality of laminations.

8. An alternator as defined in claim 7 wherein said core sections are provided with stator teeth extending radially inwardly and defining axially extending spaces for said stator windings therebetween.

9. An alternator as defined in claim 1 wherein current is applied to said field coil and said current is regulated to control output voltage from said alternator.

10. An alternator as defined in claim 1 wherein said retainer sleeve means comprises a pair of retainer sleeves, one of which is fitted around each of said pole section.

11. An alternator as defined in claim 10 wherein said retainer sleeves are formed of ferromagnetic material.

* * * * *